April 14, 1942.  F. J. LEVERONE  2,279,576
SAW ATTACHMENT
Filed Nov. 4, 1939
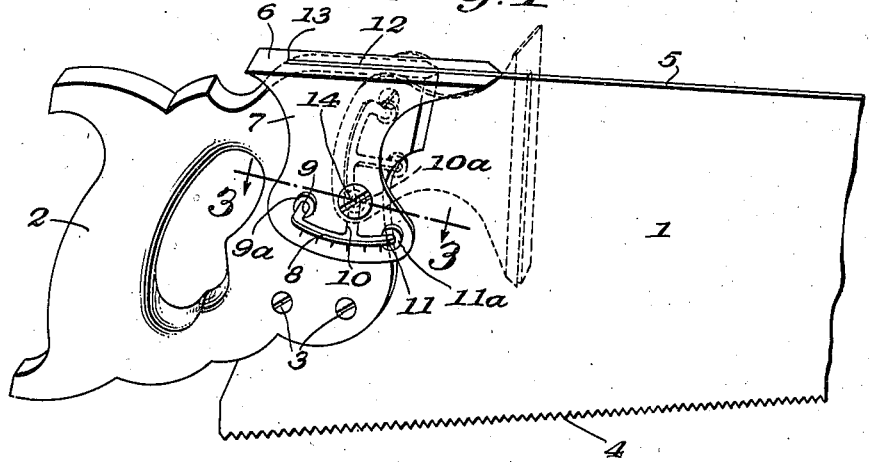
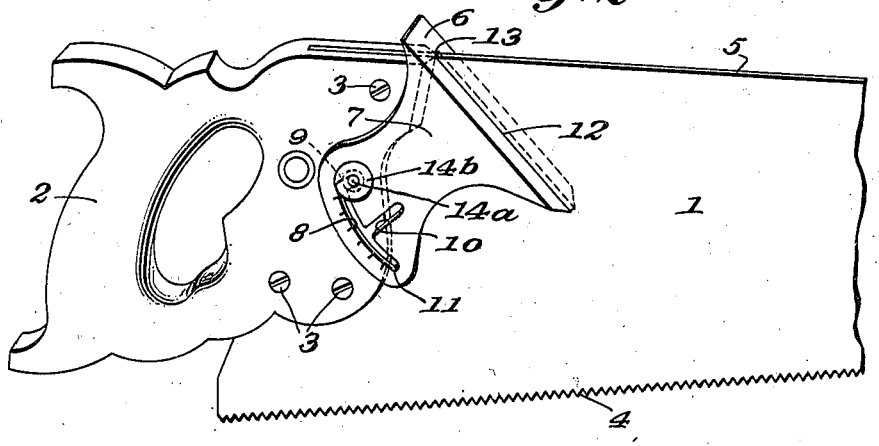
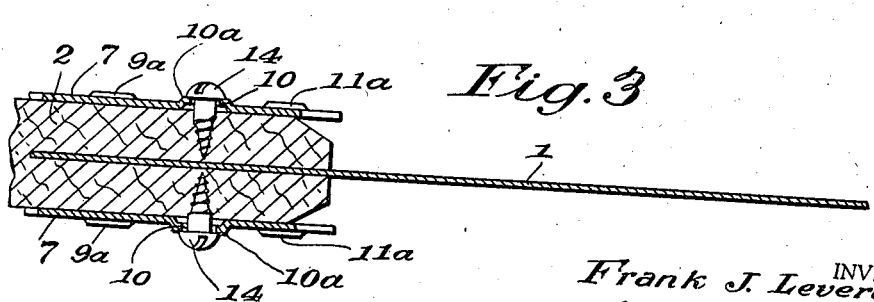
Frank J. Leverone INVENTOR.
BY Spear, Rawlings & Spear
ATTORNEYS.

Patented Apr. 14, 1942

2,279,576

UNITED STATES PATENT OFFICE 2,279,576

SAW ATTACHMENT

Frank J. Leverone, Malden, Mass.

Application November 4, 1939, Serial No. 302,890

3 Claims. (Cl. 145—35)

My present invention relates to a novel device adapted to be attached to any saw having a straight upper edge to establish with that edge an accurate square or protractor.

I am aware that certain attempts have been made to provide such a device, but these have been unsatisfactory in that they were not easily attached to the saw and interfered with its normal use.

In accordance with my invention, I provide a device that may be quickly attached to a saw in such relation to the handle that when not in use its straight edge portion overlies the upper edge of the handle and may be readily pivoted forwardly into a desired angular relation to the saw blade with the straight edge portion having a definite bearing with the upper edge of the saw.

In the drawing, I have shown illustrative embodiments of my invention from which its several novel features and advantages will be readily apparent. In the drawing:

Fig. 1 is a fragmentary view of a saw showing one embodiment of my invention.

Fig. 2 illustrates a modification of my invention, and

Fig. 3 is a vertical section along the lines 3—3 of Fig. 1.

In the drawing I have shown a typical saw having a blade 1 and a handle 2 attached to its rear by screws 3. The cutting edge is indicated at 4 and it will be appreciated that the upper edge 5 of the blade 1 is straight.

In accordance with my invention, I provide a device preferably of metal consisting of the straight edge member 6 carried by the identical body members 7. The members 6 and 7 are preferably integral. The body members 7 are provided with an arcuate slot 8 having at one end a pocket 9 and an elongated pocket 10 spaced inwardly from its other end 11. Preferably, I form the body members 7 with bosses 9a, 10a and 11a adjacent the pockets 9, 10, and the slot end 11, respectively, as shown in Fig. 1.

The straight edge member 6 is preferably slotted as at 12 to permit the member 6 to fit over the blade 1 with its upper edge 5 in contact with the bearing established by the inner end 13 of the slot 12.

My device is shown in Figs. 1 and 3 as attached to the handle 2 by means of screws 14 that serve as pivots. Obviously, the body members 7 may be interconnected through the saw, but the use of wood screws is of advantage when the device is furnished as an attachment as the necessity of drilling a hole through the blade 1 to receive the attaching pivot is thus avoided.

When my device is attached to a saw, it is placed on the saw in its dotted line position (Fig. 1) where its angularity with the upper blade edge 5 is checked. The device is then attached by means of the pivot screws 14 located with reference to the slot end 11 to give the checked angularity of the straight edge member 6 and the blade edge 5.

The use of my device will be apparent. When the device is not in use, it is positioned as shown in Fig. 1 to overlie the upper edge of the handle 2 where it does not interfere with the normal use of the saw. In this position, the pivot screws 14 are in the pockets 10. When it is desired to mark a board for cutting at a 90° angle, for example, the device is tipped forwardly to carry the inner end 13 of the slot 12 against the upper saw edge 5 and to carry the pivot screws 14 from the pockets 10 into the pocket defined by the slot end 11.

When it is desired to make a cut at an angle of 45°, for example, the body members 7 are pushed forwardly with the bearing surface 13 in contact with the upper edge 5 to carry the pivot screws 14 from the pocket 11 into the pocket 9.

I employ the bosses 9a, 10a and 11a so that the pivot screws 14 may have a tight frictional engagement therewith when the device is in any of the abovementioned illustrative positions while permitting the device to be moved readily intermediate such positions (see Fig. 3). It will also be appreciated that in any of the operative positions, the edges of the pockets in which the pivot screws 14 are located serve to resist the accidental movement of the device from its selected position.

In Fig. 2, I have shown a modification of my invention in which the pivot 14a carries a thumb nut 14b by which my device may be positively locked in any desired position intermediate the ends of the slot 8. In this modification, the bosses shown in Fig. 1 are, of course, unnecessary.

The use of two body members 7 is preferred as it makes my device of adequate strength. It is also preferred that the straight edge member 6 have a bearing on the upper saw edge 5 when in operative positions and for simplicity I prefer to accomplish that result by slotting the member 6 as shown in the drawing.

In accordance with my invention, I am able to provide a device that may be quickly and easily attached to any conventional saw having a straight upper edge to establish an accurate protractor for use in establishing cutting lines on the work without any interference with the normal use of the saw.

What I therefore claim and desire to secure by Letters Patent is:

1. A device for attachment to a saw having a handle and a blade having a straight upper edge, said device comprising a body and a straight edge member having a transverse bearing portion engageable with said upper edge, said body having a slot, pivot means attaching said body to said saw through said slot so that substantially the entire length of said straight edged member overlies said handle and said slot being shaped to permit said body member to be shifted relative to said pivot means when said portion and said upper edge are in engagement so that said straight edged member is adjustable to a plurality of definite angular positions relative to said blade.

2. A device for attachment to a saw having a handle and a blade having a straight upper edge, said device comprising a body and a straight edge member having a transverse bearing portion engageable with said upper edge, said body having an arcuate slot and an elongated pocket in communication therewith, pivot means attaching said body to said saw through said elongated pocket to permit substantially the entire length of said straight edge member to overlie said handle and to permit said body to be shifted to bring said pivot means into said arcuate slot when said device has been pivoted to bring said portion and said upper edge into engagement so that said straight edge member may have a definite angular relationship to said upper blade edge established by the position of said pivot means in said arcuate slot.

3. A device for attachment to a saw having a handle and a blade having a straight upper edge, said device comprising a body and a straight edge member having a transverse bearing portion engageable with said upper edge, said body having an arcuate slot having a pocket at one end and an elongated pocket in communication with said slot intermediate its ends, pivot means attaching said body to said saw through said elongated pocket to permit substantially the entire length of said straight edge member to overlie said handle and to permit said body to be shifted to bring said pivot means into said arcuate slot when said body has been pivoted to bring said portion and said upper edge into engagement so that said straight edge member may have a definite angular relationship to said upper blade edge when said pivot means is in either extremity of said arcuate slot, and said first named pocket and said arcuate slot being disposed to prevent movement of said body relative to said pivot means when pressure is applied against said straight edge member.

FRANK J. LEVERONE.